United States Patent
Oshima (10) Patent No.: US 12,104,713 B2
(45) Date of Patent: Oct. 1, 2024

(54) DIAPHRAGM VALVE

(71) Applicant: ADVANCE DENKI KOGYO KABUSHIKI KAISHA, Kasugai (JP)

(72) Inventor: Rikiya Oshima, Kasugai (JP)

(73) Assignee: ADVANCE DENKI KOGYO KABUSHIKI KAISHA, Kasugai (JP)

( * ) Notice: Subject to any disclaimer, the term of this patent is extended or adjusted under 35 U.S.C. 154(b) by 0 days.

(21) Appl. No.: 17/898,268

(22) Filed: Aug. 29, 2022

(65) Prior Publication Data

US 2023/0071787 A1 Mar. 9, 2023

(30) Foreign Application Priority Data

Sep. 6, 2021 (JP) ................................. 2021-144769

(51) Int. Cl.
*F16K 7/17* (2006.01)
*F16J 3/02* (2006.01)
(Continued)

(52) U.S. Cl.
CPC ................ *F16K 41/12* (2013.01); *F16J 3/02* (2013.01); *F16K 7/17* (2013.01); *F16K 27/0236* (2013.01); *F16K 41/103* (2013.01)

(58) Field of Classification Search
CPC .......... F16K 41/12; F16K 41/103; F16K 7/17; F16K 7/16; F16K 25/005; F16K 27/0236;
(Continued)

(56) References Cited

U.S. PATENT DOCUMENTS 4,077,605 A * 3/1978 Kutz et al. .............. F16K 41/12
251/357
4,887,516 A * 12/1989 Scott ....................... F01B 19/02
92/100
(Continued)

FOREIGN PATENT DOCUMENTS

CH 624456 A5 7/1981
CN 110307357 A 10/2019
(Continued)

OTHER PUBLICATIONS

Office Action of corresponding Austrian Patent Application No. 50647/2022 issued Dec. 2, 2022 (21 sheets, 9 sheets translation, 30 sheets total).

*Primary Examiner* — Craig J Price
*Assistant Examiner* — Andrew J Rost
(74) *Attorney, Agent, or Firm* — Kratz, Quintos & Hanson, LLP (57) ABSTRACT

[Object] A diaphragm can strongly be fixed to a flow path-side body by a diaphragm-holder, a thickness of the flow path-side body of an outer periphery of a diaphragm is thinned, and the flow path-side body is downsized.
[Solving Means] A diaphragm-holder abutting surface 75 is formed between a diaphragm-holder inner peripheral side ring-shaped projection 73 and a diaphragm-holder outer peripheral side ring-shaped projection 74, a diaphragm-holder inner peripheral side end surface 73s is abutted against a first fixed portion piston-side end surface 63Ap, a diaphragm-holder inner peripheral side outer peripheral surface 73o is abutted against a second fixed portion inner peripheral surface 63Bi, a diaphragm-holder outer peripheral side inner peripheral surface 74i is abutted against a body-side projection outer peripheral surface 16o, and the diaphragm-holder abutting surface 75 is abutted against the (Continued)

second fixed portion piston-side end surface 63Bp and a body-side projection end surface 16s.

6 Claims, 4 Drawing Sheets

(51) Int. Cl.
*F16K 27/02* (2006.01)
*F16K 41/10* (2006.01)
*F16K 41/12* (2006.01)

(58) Field of Classification Search
CPC ... F16K 31/1221; F16J 3/00; F16J 3/02; F16J 3/04; F16J 3/042
See application file for complete search history.

(56) References Cited

U.S. PATENT DOCUMENTS

| | | | |
|---|---|---|---|
| 5,779,224 A * | 7/1998 | Fukano et al. | F16K 41/12 251/64 |
| 2008/0116412 A1 * | 5/2008 | Masamura et al. | F16K 7/14 251/227 |
| 2009/0266428 A1 | 10/2009 | Yoshino | |
| 2009/0283155 A1 | 11/2009 | Yoshino | |
| 2010/0207048 A1 * | 8/2010 | Inoue | F16K 41/103 251/331 |
| 2013/0168592 A1 | 7/2013 | Yan | |

FOREIGN PATENT DOCUMENTS

| | | |
|---|---|---|
| DE | 2627652 A1 | 1/1977 |
| DE | 102012005093 A1 | 9/2013 |
| DE | 102012025411 A1 | 7/2014 |
| FR | 2287633 A1 | 5/1976 |
| JP | H05-118451 A | 5/1993 |
| JP | 2005-163877 A | 6/2005 |
| JP | 2007-321958 A | 12/2007 |

* cited by examiner

DIAPHRAGM VALVE

TECHNICAL FIELD

The present invention relates to a diaphragm valve used in a washing process and a peeling-off process in a silicon wafer process in which medicinal solution of high corrosive characteristics especially such as strong acid and strong alkali is frequently used.

BACKGROUND TECHNIQUE

As disclosed in patent document 1 for example, in a diaphragm valve, a diaphragm is placed on one end of a piston, and the diaphragm includes a membrane portion and a fixed portion formed on an outer periphery of the membrane portion.

According to the diaphragm valve of patent document 1, a projecting portion of a body and the fixed portion of the diaphragm are welded to each other, and the fixed portion is held on the body by a diaphragm-holder.

PRIOR ART DOCUMENT

Patent Document

[Patent Document 1] Japanese Patent Application Laid-open No. 2005-163877

SUMMARY OF THE INVENTION

Problem to be Solved by the Invention

According to the method described in patent document 1, however, since a welding part is fitted and the welding operation is carried out by this welding part, there is a problem that the number of producing processes is increased.

Hence, it is an object of the present invention to provide a diaphragm valve in which the diaphragm can strongly be fixed to a flow path-side body by the diaphragm-holder, and the flow path-side body can be downsized by thinning a thickness of the flow path-side body in the outer periphery of the diaphragm, or by eliminating the need of a thick portion.

Means for Solving the Problem

A diaphragm valve 1 of the present invention includes: a flow path-side body 10 forming an inflow flow path 11, an outflow flow path 12 and a valve seat 13; a driving-side body 20 in which a piston 30 for moving a valve body 40 with respect to the valve seat 13 is placed; and a diaphragm 60 placed on one end side of the piston 30, in which the diaphragm 60 includes a thick portion 61 connected to the piston 30, a membrane portion 62 formed on an outer periphery of the thick portion 61, and a fixed portion 63 formed on an outer periphery of the membrane portion 62, the fixed portion 63 includes a first fixed portion 63A located on a side of the membrane portion 62, and a second fixed portion 63B located on an outer periphery of the first fixed portion 63A, a first fixed portion piston-side end surface 63Ap is formed in the first fixed portion 63A on a side of the piston 30, a first fixed portion valve body-side end surface 63Ab is formed in the first fixed portion 63A on a side of the valve body 40, a second fixed portion piston-side end surface 63Bp is formed in the second fixed portion 63B on a side of the piston 30, a second fixed portion valve body-side end surface 63Bb is formed in the second fixed portion 63B on a side of the valve body 40, a second fixed portion inner peripheral surface 63Bi is formed on an inner peripheral side of the second fixed portion, and a second fixed portion outer peripheral surface 63Bo is formed on an outer peripheral side of the second fixed portion, and the fixed portion 63 is mounted on the flow path-side body 10 by a diaphragm-holder 70, wherein the flow path-side body 10 includes a body-side first end surface 15 which brings the first fixed portion valve body-side end surface 63Ap and the second fixed portion valve body-side end surface 63Bb into abutment against each other, and a body-side ring-shaped projection 16 forming a body-side projection inner peripheral surface 16i against which the second fixed portion outer peripheral surface 63Bo abuts, the diaphragm-holder 70 includes a diaphragm-holder inner peripheral side ring-shaped projection 73, and a diaphragm-holder outer peripheral side ring-shaped projection 74 located on an outer periphery of the diaphragm-holder inner peripheral side ring-shaped projection 73, a diaphragm-holder abutting surface 75 is formed between the diaphragm-holder inner peripheral side ring-shaped projection 73 and the diaphragm-holder outer peripheral side ring-shaped projection 74, a diaphragm-holder inner peripheral side end surface 73s of the diaphragm-holder inner peripheral side ring-shaped projection 73 is abutted against the first fixed portion piston-side end surface 63Ap, diaphragm-holder inner peripheral side outer peripheral surface 73o of the diaphragm-holder inner peripheral side ring-shaped projection 73 is abutted against the second fixed portion inner peripheral surface 63Bi, a diaphragm-holder outer peripheral side inner peripheral surface 74i of the diaphragm-holder outer peripheral side ring-shaped projection 74 is abutted against a body-side projection outer peripheral surface 16o of the body-side ring-shaped projection 16, and the diaphragm-holder abutting surface 75 is abutted against the second fixed portion piston-side end surface 63Bp and a body-side projection end surface 16s of the body-side ring-shaped projection 16.

Effect of the Invention

According to the diaphragm valve of the present invention, the diaphragm-holder inner peripheral side end surface of the diaphragm-holder inner peripheral side ring-shaped projection is abutted against the first fixed portion piston-side end surface, the diaphragm-holder inner peripheral side outer peripheral surface of the diaphragm-holder inner peripheral side ring-shaped projection is abutted against the second fixed portion inner peripheral surface, the diaphragm-holder outer peripheral side inner peripheral surface of the diaphragm-holder outer peripheral side ring-shaped projection is abutted against the body-side projection outer peripheral surface of the body-side ring-shaped projection, and the diaphragm-holder abutting surface is abutted against the second fixed portion piston-side end surface and the body-side projection end surface of the body-side ring-shaped projection. According to this, the diaphragm can strongly be fixed to the flow path-side body by the diaphragm-holder.

Further, the diaphragm can strongly be mounted on the flow path-side body by sandwiching the fixed portion and the body-side ring-shaped projection by the diaphragm-holder. Since an outer thickness of the body-side ring-shaped projection does not influence on the mounting operation of the diaphragm, it is unnecessary to thin the thickness of the flow path-side body in the outer periphery of the diaphragm or it is unnecessary to provide the thick portion, and the flow path-side body can be downsized.

MODE FOR CARRYING OUT THE INVENTION

According to a diaphragm valve of a first embodiment of the present invention, a flow path-side body includes a body-side first end surface which brings a first fixed portion valve body-side end surface and a second fixed portion valve body-side end surface into abutment against each other, and a body-side ring-shaped projection forming a body-side projection inner peripheral surface against which a second fixed portion outer peripheral surface abuts. A diaphragm-holder includes a diaphragm-holder inner peripheral side ring-shaped projection and a diaphragm-holder outer peripheral side ring-shaped projection located on an outer periphery of the diaphragm-holder inner peripheral side ring-shaped projection. A diaphragm-holder abutting surface is formed between the diaphragm-holder inner peripheral side ring-shaped projection and the diaphragm-holder outer peripheral side ring-shaped projection. The diaphragm-holder inner peripheral side end surface of the diaphragm-holder inner peripheral side ring-shaped projection is abutted against, a first fixed portion piston-side end surface. The diaphragm-holder inner peripheral side outer peripheral surface of the diaphragm-holder inner peripheral side ring-shaped projection is abutted against a second fixed portion inner peripheral surface. The diaphragm-holder outer peripheral side inner peripheral surface of the diaphragm-holder outer peripheral side ring-shaped projection is abutted against a body-side projection outer peripheral surface of a body-side ring-shaped projection. The diaphragm-holder abutting surface is abutted against the second fixed portion piston-side end surface and the body-side projection end surface of the body-side ring-shaped projection.

According to this embodiment, the diaphragm-holder inner peripheral side end surface of the diaphragm-holder inner peripheral side ring-shaped projection is abutted against the first fixed portion piston-side end surface, the diaphragm-holder inner peripheral side outer peripheral surface of the diaphragm-holder inner peripheral side ring-shaped projection is abutted against the second fixed portion inner peripheral surface, the diaphragm-holder outer peripheral side inner peripheral surface of the diaphragm-holder outer peripheral side ring-shaped projection is abutted against the body-side projection outer peripheral surface of the body-side ring-shaped projection, and the diaphragm-holder abutting surface is abutted against the second fixed portion piston-side end surface and the body-side projection end surface of the body-side ring-shaped projection. According to this, the diaphragm can strongly be fixed to the flow path-side body by the diaphragm-holder.

Further, according to this embodiment, the diaphragm can strongly be mounted on the flow path-side body by sandwiching the fixed portion and the body-side ring-shaped projection by the diaphragm-holder. Since an outer thickness of the body-side ring-shaped projection does not influence on the mounting operation of the diaphragm, it is unnecessary to thin the thickness of the flow path-side body in the outer periphery of the diaphragm or it is unnecessary to provide the thick portion, and the flow path-side body can be downsized.

According to a second embodiment of the invention, in the diaphragm valve of the first embodiment, the diaphragm-holder inner peripheral side ring-shaped projection and the diaphragm-holder outer peripheral side ring-shaped projection are press fitted into the body-side ring-shaped projection and the second fixed portion.

In the second embodiment, by press fitting the diaphragm-holder inner peripheral side ring-shaped projection and the diaphragm-holder outer peripheral side ring-shaped projection into the body-side ring-shaped projection and the second fixed portion, the diaphragm can further strongly be mounted on the flow path-side body.

According to a third embodiment of the invention, in the diaphragm valve of the second embodiment, a second fixed portion chamfered portion is formed at a boundary between the second fixed portion inner peripheral surface and the second fixed portion piston-side end surface, and a diaphragm-holder inner peripheral side chamfered portion is formed at a boundary between the diaphragm-holder inner peripheral side outer peripheral surface and the diaphragm-holder inner peripheral side end surface.

In the third embodiment, the press fitting operation can be carried out easily.

According to a fourth embodiment of the invention, in the diaphragm valve of the first embodiment, the diaphragm-holder is made of material having higher mechanical strength than the diaphragm and the flow path-side body.

In the fourth embodiment, the press fitting operation can be carried out easily, and strength after the press fitting is high.

According to a fifth embodiment of the invention, in the diaphragm valve of the first embodiment, the diaphragm and the valve body are made of PTFE or PFA, and the diaphragm-holder is made of fluorocarbon resin such as PVdF, thermoplastic resin such as PPS and PP, or composite material in which glass or carbon is mixed in thermoplastic resin.

In the fifth embodiment, since the diaphragm and the valve body are made of PTFE or PFA, corrosive characteristics is excellent, and bending performance of the diaphragm is also excellent.

According to a sixth embodiment of the invention, in the diaphragm valve of any one of the first to fifth embodiments, the diaphragm-holder is sandwiched between the flow path-side body and the driving-side body, and a sliding surface on which the piston slides is formed at a central portion of the diaphragm-holder.

In the sixth embodiment, since the diaphragm and the piston are positioned by the diaphragm-holder, the diaphragm and the piston are less prone to be deviated from each other, and stable operation of the diaphragm can be secured.

Embodiments

A diaphragm valve according to an embodiment of the present invention will be described below.

Figure 1:
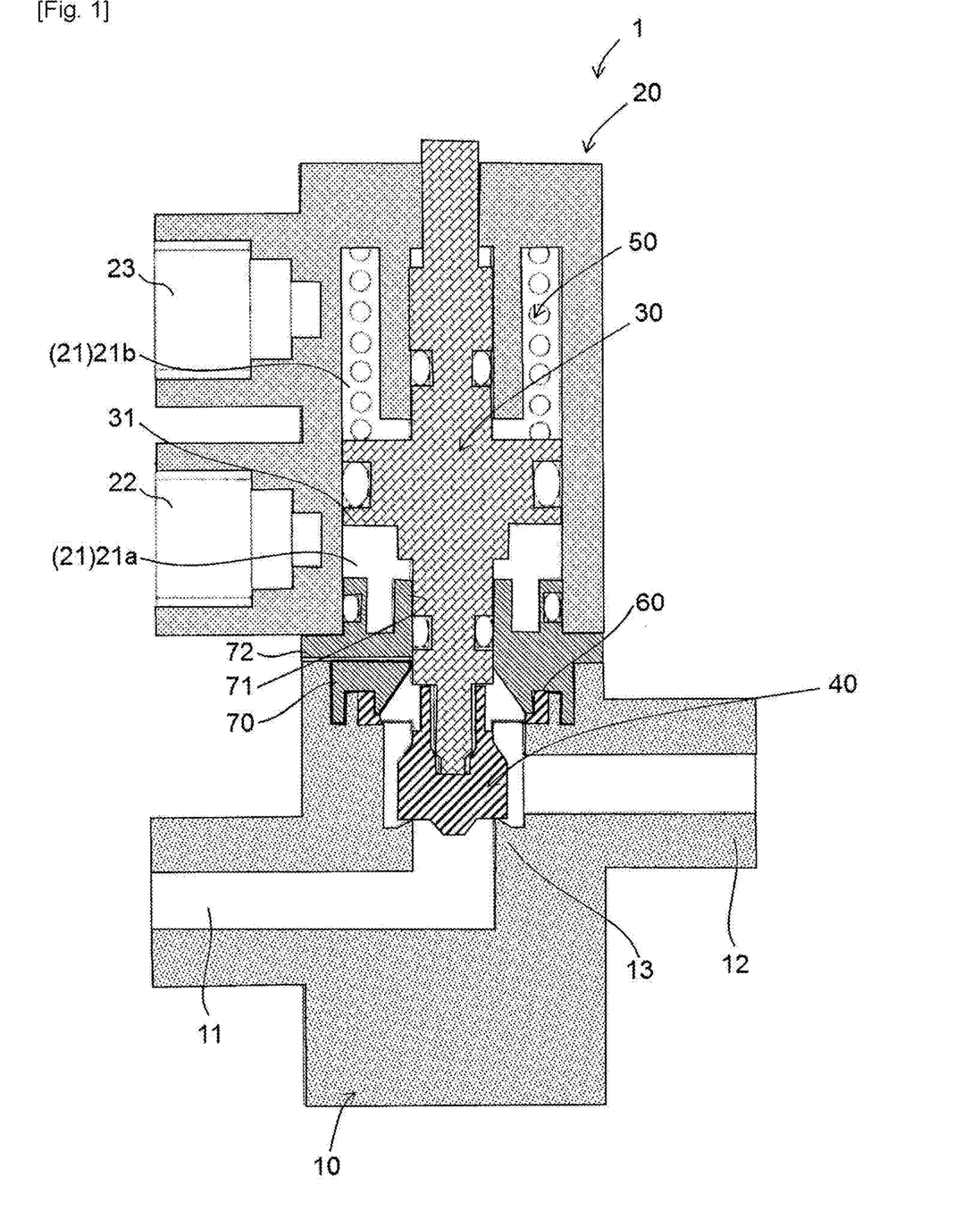
FIG. 1 is a sectional view showing a valve-closed state of a diaphragm valve according to an embodiment of the present invention.

FIG. 1 is a sectional view showing a valve-closed state of the diaphragm valve according to the embodiment.

A diaphragm valve 1 according to the embodiment includes a flow path-side body 10 and a driving-side body 20.

An inflow flow path 11 into which fluid to be controlled (to-be controlled fluid, hereinafter) flows, an outflow flow path 12 from which to-be controlled fluid flows out, and a valve seat 13 located between the inflow flow path 11 and the outflow flow path 12 are formed in a flow path-side body 10.

A piston cylindrical space 21 in which a piston 30 is placed is formed in the driving-side body 20.

Air flowing passages 22 and 23 are formed in the driving-side body 20. The air flowing passage 22 is in communication with a piston cylindrical space 21a located between a diaphragm 60 and a piston enlarged portion 31. The air flowing passage 23 is in communication with a piston cylindrical space 21b where piston biasing means 50 is placed.

A valve body 40 is placed in one end of the piston 30.

The piston cylindrical space 21 includes the piston biasing means 50 which biases the piston 30. The piston biasing means 50 biases the piston 30 in a direction in which the valve body 40 abuts against the valve seat 13.

The piston enlarged portion 31 is formed in the piston 30. The piston biasing means 50 presses the piston enlarged portion 31, thereby biasing the piston 30. A coil spring can be used as the piston biasing means 50 for example.

On end of the piston cylindrical space 21 opens at a position opposed to the valve seat 13.

The diaphragm 60 is placed in the opening, and the piston cylindrical space 21 and the valve seat 13 are separated from each other by the diaphragm 60.

The diaphragm 60 is placed on the side of the one end of the piston 30. The one end of the piston 30 is located at a center of the diaphragm 60, and the valve body 40 is placed in the diaphragm 60 on the side of the valve seat 13.

The diaphragm 60 is deformed as the piston 30 moves.

The diaphragm 60 is mounted in the flow path-side body 10 by a diaphragm-holder 70.

The diaphragm-holder 70 is sandwiched between the flow path-side body 10 and the driving-side body 20. A sliding surface 71 on which the piston 30 slides is formed in a center portion of the diaphragm-holder 70.

Therefore, since the diaphragm 60 and the piston 30 are positioned by the diaphragm-holder 70, the diaphragm 60 and the piston 30 are less prone to be deviated from each other, and stable operation of the diaphragm 60 can be secured.

A communication hole 72 is formed in the diaphragm-holder 70. The communication hole 72 is in communication with a space which is surrounded by the diaphragm 60, the diaphragm-holder 70 and the piston 30.

Figure 2:
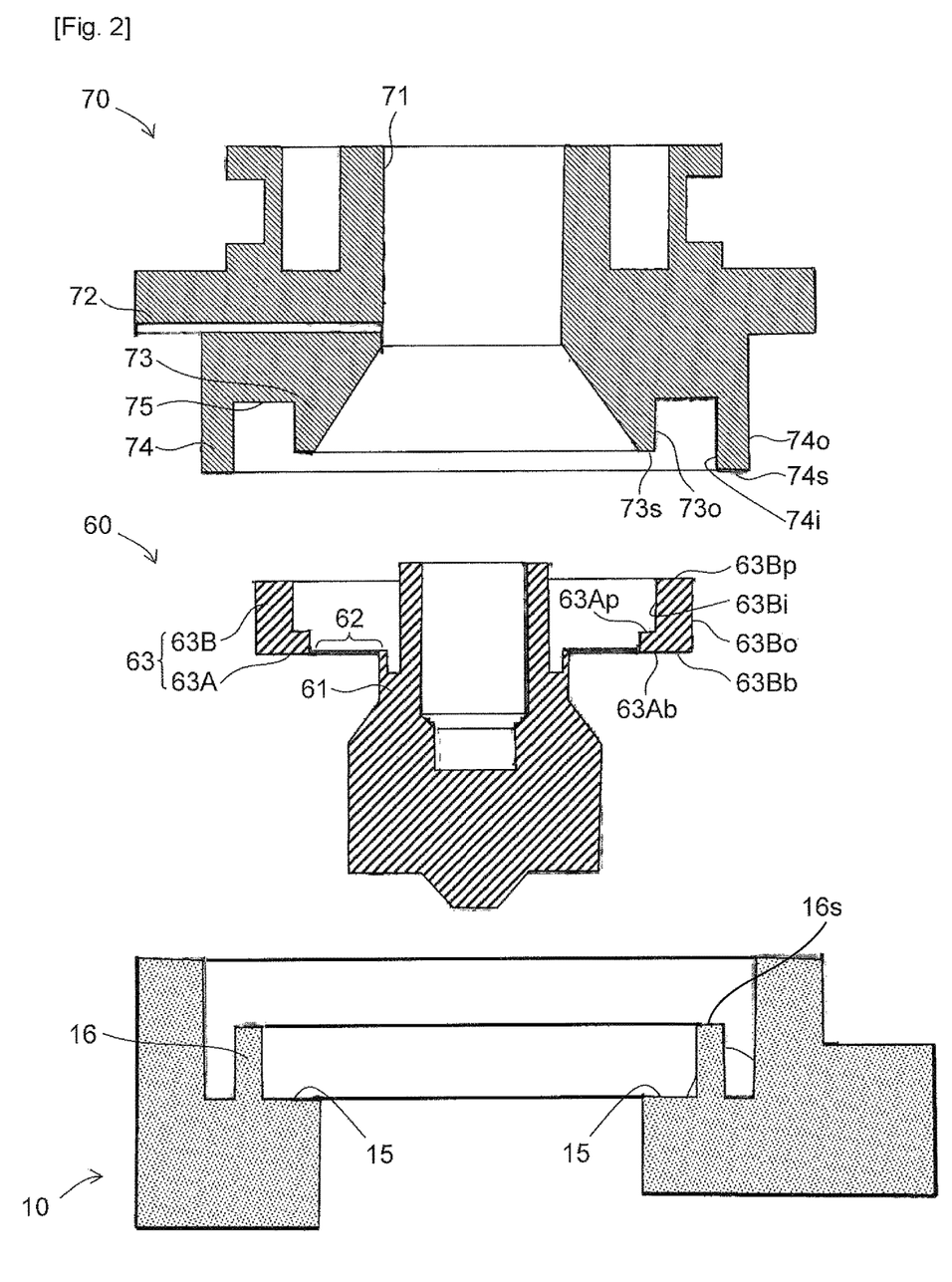
FIG. 2 is an exploded sectional view of essential portions in FIG. 1.

FIG. 2 is an exploded sectional view of essential portions in FIG. 1.

The diaphragm 60 includes a thick portion 61 connected to the piston 30, a membrane portion 62 formed on an outer periphery of the thick portion 61, and a fixed portion 63 formed on an outer periphery of the membrane portion 62. The diaphragm 60 is connected to the piston 30 at a central portion of the thick portion 61, and the membrane portion 62 is mainly deformed.

The fixed portion 63 includes a first fixed portion 63A located on the side of the membrane portion 62, and a second fixed portion 63B located at an outer periphery of the first fixed portion 63A.

In the first fixed portion 63A, a first fixed portion piston-side end surface 63Ap is formed on the side of the piston 30, and a first fixed portion valve body-side end surface 63Ab is formed on the side of the valve body 40.

In the second fixed portion 63B, a second fixed portion piston-side end surface 63Bp is formed on the side of the piston 30, a second fixed portion valve body-side end surface 63Bb is formed on the side of the valve body 40, a second fixed portion inner peripheral surface 63Bi is formed on an inner peripheral side of the second fixed portion 63B, and a second fixed portion outer peripheral surface 63Bo is formed on an outer peripheral side of the second fixed portion 63B.

The flow path-side body 10 includes a body-side first end surface 15 and a body-side ring-shaped projection 16.

The first fixed portion valve body-side end surface 63Ab and the second fixed portion valve body-side end surface 63Bb abut against the body-side first end surface 15.

A body-side projection inner peripheral surface 16i is formed by the body-side ring-shaped projection 16 on an inner periphery thereof, a body-side projection outer peripheral surface 16o is formed by the body-side ring-shaped projection 16 on an outer periphery thereof, and a body-side projection end surface 16s is formed on an end of the body-side ring-shaped projection 16.

A body-side ring-shaped groove 17 is formed in the flow path-side body 10 in an outer periphery of the body-side ring-shaped projection 16.

The second fixed portion outer peripheral surface 63Bo abuts against the body-side projection inner peripheral surface 16i.

The diaphragm-holder 70 includes a diaphragm-holder inner peripheral side ring-shaped projection 73, and a diaphragm-holder outer peripheral side ring-shaped projection 74 located on an outer periphery of the diaphragm-holder inner peripheral side ring-shaped projection 73.

A diaphragm-holder abutting surface 75 is formed between the diaphragm-holder inner peripheral side ring-shaped projection 73 and the diaphragm-holder outer peripheral side ring-shaped projection 74.

A diaphragm-holder inner peripheral side outer peripheral surface 73o is formed on an outer periphery of the diaphragm-holder inner peripheral side ring-shaped projection 73, and a diaphragm-holder inner peripheral side end surface 73s is formed on a tip end of the diaphragm-holder inner peripheral side ring-shaped projection 73.

A diaphragm-holder outer peripheral side inner peripheral surface 74i is formed on an inner periphery of the diaphragm-holder outer peripheral side ring-shaped projection 74, a diaphragm holder outer peripheral side outer peripheral surface 74o is formed on an outer periphery of the diaphragm-holder outer peripheral side ring-shaped projection 74, and a diaphragm-holder outer peripheral side end surface 74s is formed on a tip end of the diaphragm-holder outer peripheral side ring-shaped projection 74.

The diaphragm-holder inner peripheral side outer peripheral surface 73o and the diaphragm-holder outer peripheral side inner peripheral surface 74i are formed such that they are opposed to each other.

The diaphragm-holder inner peripheral side end surface 73s is abutted against the first fixed portion piston-side end surface 63Ap, the diaphragm-holder inner peripheral side outer peripheral surface 73o is abutted against the second fixed portion inner peripheral surface 63Bi, the diaphragm-holder outer peripheral side inner peripheral surface 74i is abutted against the body-side projection outer peripheral surface 16o, and the diaphragm-holder abutting surface 75 is abutted against the second fixed portion piston-side end surface 63Bp and the body-side projection end surface 16s.

Therefore, the diaphragm 60 can strongly be fixed to the flow path-side body 10 by the diaphragm-holder 70.

In this embodiment, the diaphragm 60 can further strongly be fixed to the flow path-side body 10 by press fitting the diaphragm-holder outer peripheral side ring-shaped projection 74 into the body-side ring-shaped groove 17, but it is not always necessary that the outer periphery of the body-side ring-shaped groove 17 is thick.

The diaphragm 60 can strongly be mounted on the flow path-side body 10 by sandwiching the fixed portion 63 and the body-side ring-shaped projection 16 by the diaphragm-holder 70. Since the outer thickness of the body-side ring-shaped projection 16 does not influence on the mounting operation of the diaphragm 60, it is unnecessary to thin the thickness of the flow path-side body 10 in the outer periphery of the diaphragm 60, or it is unnecessary to provide a thick portion, and the flow path-side body 10 can be downsized.

Figure 3:
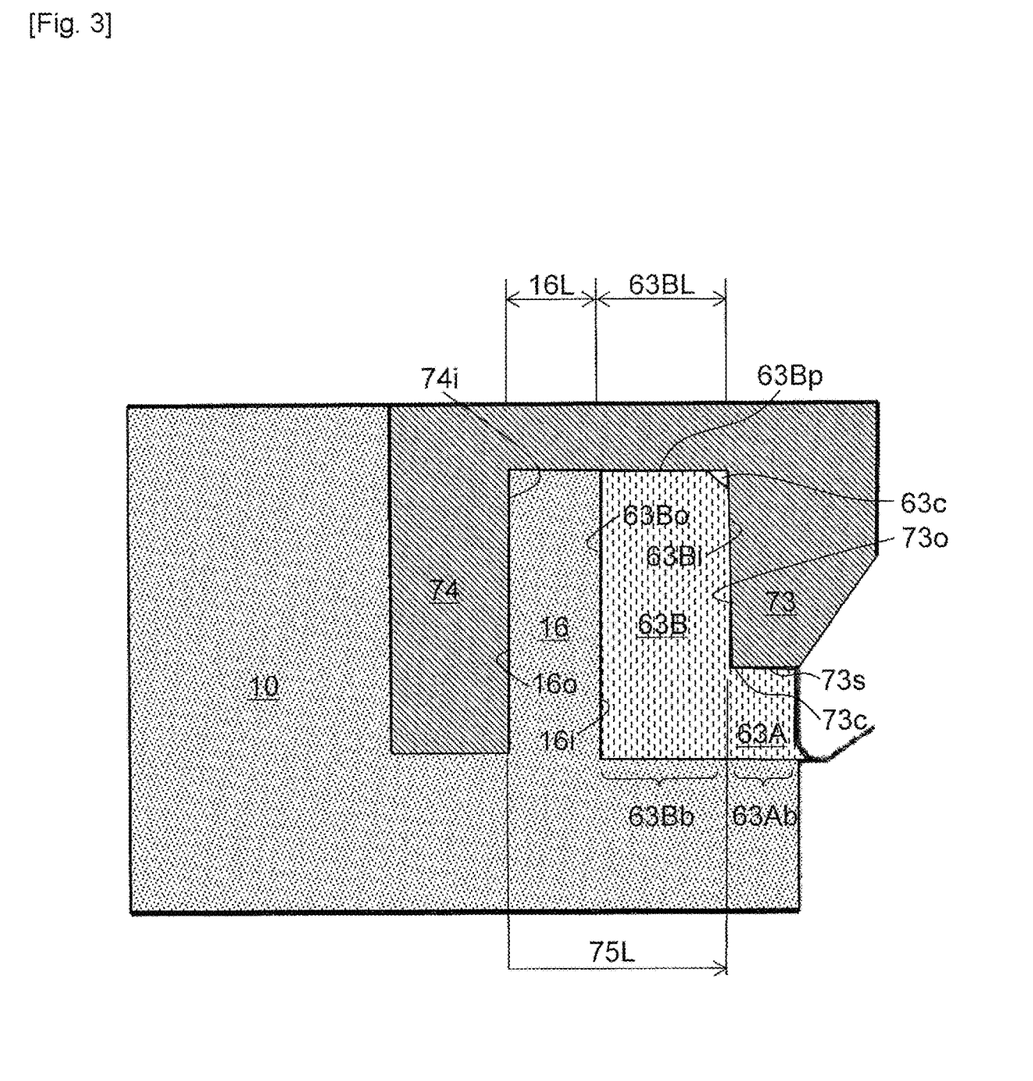
FIG. 3 is a detailed sectional view of essential portions in FIG. 1.

FIG. 3 is a detailed sectional view of essential portions in FIG. 1.

As shown in FIG. 3, a second fixed portion chamfered portion 63c is formed at a boundary between the second fixed portion inner peripheral surface 63Bi and the second fixed portion piston-side end surface 63Bp, and a diaphragm-holder inner peripheral side chamfered portion 73c is formed at a boundary between the diaphragm-holder inner peripheral side outer peripheral surface 73o and the diaphragm-holder inner peripheral side end surface 73s.

A whole surface of the body-side projection inner peripheral surface 16i and a whole surface of the second fixed portion outer peripheral surface 63Bo are abutted against each other with no space. A whole surface of the body-side projection outer peripheral surface 16o and a whole surface of the diaphragm-holder outer peripheral side inner peripheral surface 74i are abutted against each other with no space. A whole surface of the second fixed portion inner peripheral surface 63Bi and a whole surface of the diaphragm-holder inner peripheral side outer peripheral surface 73o are abutted against each other with no space except the second fixed portion chamfered portion 63c and the diaphragm-holder inner peripheral side chamfered portion 73c.

Here, a thickness of the body-side ring-shaped projection 16 is defined as 16L, a thickness of the second fixed portion 63B is defined as 63BL, and a gap size between the diaphragm-holder inner peripheral side outer peripheral surface 73o and the diaphragm-holder outer peripheral side inner peripheral surface 74i is defined as 75L. A relation 16L+63BL>75L is established.

The diaphragm-holder inner peripheral side ring-shaped projection 73 and the diaphragm-holder outer peripheral side ring-shaped projection 74 are press fitted into the body-side ring-shaped projection 16 and the second fixed portion 63B.

By press fitting the diaphragm-holder inner peripheral side ring-shaped projection 73 and the diaphragm-holder outer peripheral side ring-shaped projection 74 into the body-side ring-shaped projection 16 and the second fixed portion 63B in this manner, the diaphragm 60 can be mounted on the flow path-side body 10 more strongly.

Since the second fixed portion chamfered portion 63c and the diaphragm-holder inner peripheral side chamfered portion 73c are formed, the press fitting operation can be carried out easily.

The diaphragm-holder 70 is made of material having higher mechanical strength than the diaphragm 60 and the flow path-side body 10. According to this, the press fitting operation can be carried out easily, and strength after the press fitting operation is high.

It is preferable that the diaphragm 60 and the valve body 40 are made of PTFE (polytetrafluoroethylene) or PFA (ethylene tetrafluoride perfluoroalkoxyethylene copolymer resin), or thermoplastic resin in which PTFE or PFA is added.

If the diaphragm 60 and the valve body 40 are made of PTFE or PFA, corrosive characteristics thereof become excellent, and bending performance of the diaphragm 60 also becomes excellent.

It is preferable that the diaphragm-holder 70 is made of fluorocarbon resin such as PVdF (polyvinylidene fluoride), fluorocarbon resin such as thermoplastic resin, thermoplastic resin such a PPS (polyphenylene sulfide) or PP (polypropylene), or composite material in which glass or carbon is mixed in thermoplastic resin. When the diaphragm-holder 70 is made of PTFE or PFA, mechanical strength can be enhanced by mixing metal guide in the diaphragm-holder outer peripheral side ring-shaped projection 74.

The driving-side body 20 can be made of fluorocarbon resin such as PTFE, PFA and PVdf, or thermoplastic resin such as PVC, PPS or PP.

The second fixed portion chamfered portion 63c and the diaphragm-holder inner peripheral side chamfered portion 73c may not be provided.

Figure 4:
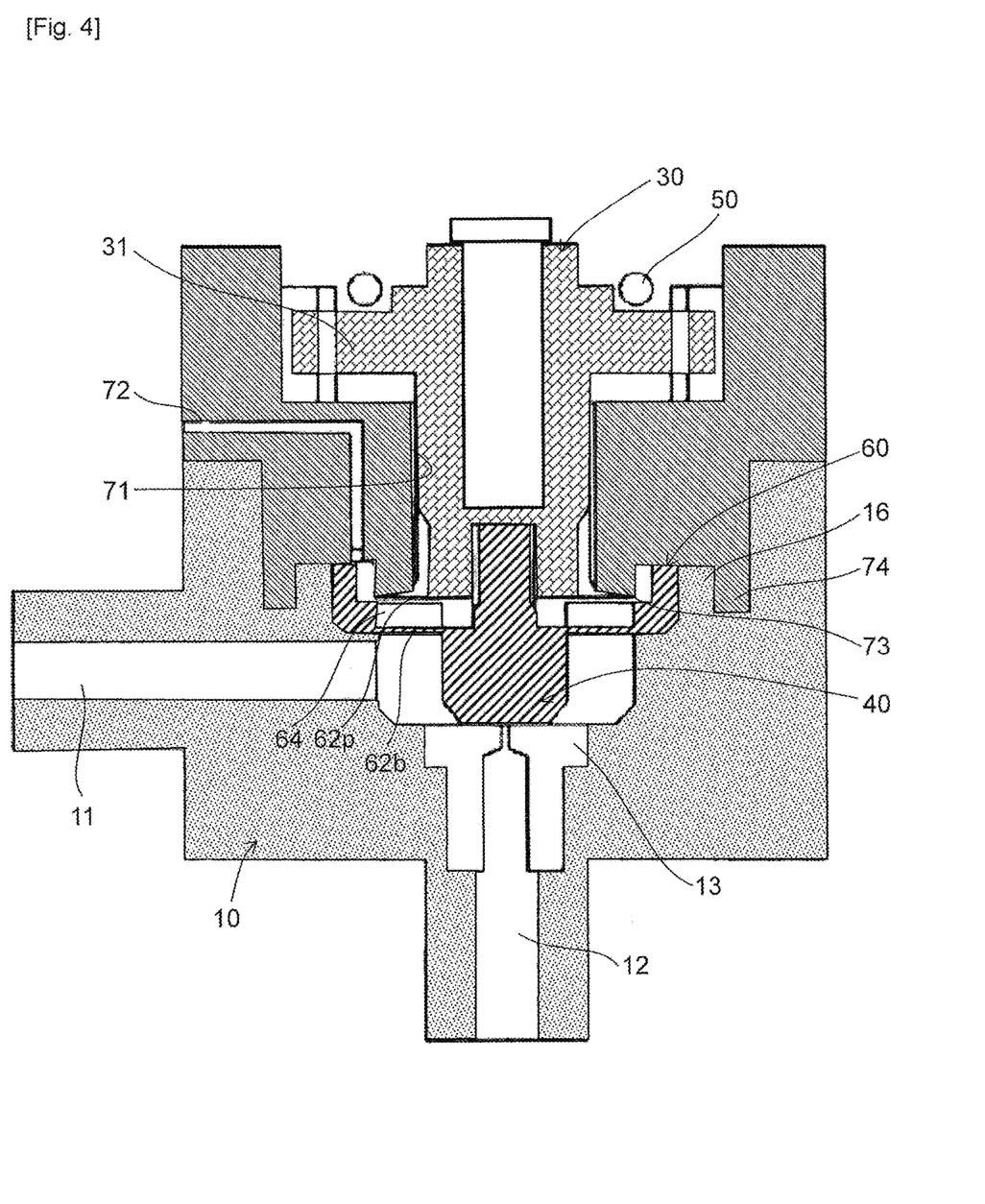
FIG. 4 is a sectional view of essential portions of a diaphragm valve according to another embodiment of the invention.

FIG. 4 is a sectional view of essential portions of a diaphragm valve according to another embodiment of the invention.

Configuration of this embodiment is the same as that of the previous embodiment shown in FIGS. 1 to 3 in that the double membrane is used as the diaphragm 60 and the diaphragm-holder 70 and the driving-side body 20 are integrally formed. Therefore, the same symbols are allocated and description thereof will be omitted.

In this embodiment, a membrane portion 62 of a diaphragm 60 is composed of a piston-side membrane portion 62p and a valve body-side membrane portion 62b, and a ring-shaped diaphragm-holder member 64 is placed between the piston-side membrane portion 62p and the valve body-side membrane portion 62b.

As described above, the diaphragm-holder 70 may be made of resin and formed integrally with the driving-side body 20 and this is the same in the previous embodiment shown in FIGS. 1 to 3.

When the membrane portion 62 is composed of the piston-side membrane portion 62p and the valve body-side membrane portion 62b as in this embodiment, the communication hole 72 is in communication with a membrane portion space between the piston-side membrane portion 62p and the valve body-side membrane portion 62b.

As described above, in a diaphragm valve 1 of this embodiment, a diaphragm-holder inner peripheral side end surface 73s of a diaphragm-holder inner peripheral side ring-shaped projection 73 is abutted against a first fixed portion piston-side end surface 63Ap, a diaphragm-holder inner peripheral side chamfered portion 73o of the diaphragm-holder inner peripheral side ring-shaped projection 73 is abutted against a second fixed portion inner peripheral surface 63Bi, a diaphragm-holder outer peripheral side inner peripheral surface 74i of a diaphragm-holder outer peripheral side ring-shaped projection 74 is abutted against a body-side projection outer peripheral surface 16o of a body-side ring-shaped projection 16, and a diaphragm-holder abutting surface 75 is abutted against a second fixed portion piston-side end surface 63Bp and a body-side projection end surface 16s of a body-side ring-shaped projection 16. According to this, the diaphragm 60 can strongly be fixed to the flow path-side body 10 by the diaphragm-holder 70.

INDUSTRIAL APPLICABILITY

The present invention is suitable for a diaphragm valve used in a washing process or a peeling-off process of wafer process especially in a semiconductor manufacture field.

EXPLANATION OF SYMBOLS 1 diaphragm valve
10 flow path-side body
11 inflow flow path
12 outflow flow path
13 valve seat
14 membrane portion communication hole
15 body-side first end surface
16 body-side ring-shaped projection
16$i$ body-side projection inner peripheral surface
16$o$ body-side projection outer peripheral surface
16$s$ body-side projection end surface
16L thickness
17 body-side ring-shaped groove
20 driving-side body
21 piston cylindrical space
21$a$ piston cylindrical space
21$b$ piston cylindrical space
22, 23 air flowing passage
30 piston
31 piston enlarged portion
40 valve body
50 piston biasing means
60 diaphragm
61 thick portion
62 membrane portion
62$b$ valve body-side membrane portion
62$p$ piston-side membrane portion
62$s$ membrane portion space
63 fixed portion
63A first fixed portion
63Ab first fixed portion valve body-side end surface
63Ap first fixed portion piston-side end surface
63B second fixed portion
63Bb second fixed portion valve body-side end surface
63Bp second fixed portion piston-side end surface
63Bi second fixed portion inner peripheral surface
63Bo second fixed portion outer peripheral surface
63BL thickness
63$c$ second fixed portion chamfered portion
64 diaphragm-holder member
70 diaphragm-holder
71 sliding surface
72 communication hole
73 diaphragm-holder inner peripheral side ring-shaped projection
73$s$ diaphragm-holder inner peripheral side end surface
73$o$ diaphragm-holder inner peripheral side outer peripheral surface
73$c$ diaphragm-holder inner peripheral side chamfered portion
74 diaphragm-holder outer peripheral side ring-shaped projection
74$i$ diaphragm-holder outer peripheral side inner peripheral surface
74$o$ diaphragm-holder outer peripheral side outer peripheral surface
74$s$ diaphragm-holder outer peripheral side end surface
75 diaphragm-holder abutting surface
75L gap size

The invention claimed is:
1. A diaphragm valve comprising:
a flow path-side body forming an inflow flow path, an outflow flow path and a valve seat;
a driving-side body in which a piston for moving a valve body with respect to the valve seat is placed; and
a diaphragm placed on one end side of the piston, in which
the diaphragm includes a thick portion connected to the piston,
a membrane portion formed on an outer periphery of the thick portion, and
a fixed portion formed on an outer periphery of the membrane portion,
the fixed portion includes a first fixed portion located on a side of the membrane portion, and
a second fixed portion located on an outer periphery of the first fixed portion,
a first fixed portion piston-side end surface is formed in the first fixed portion on a side of the piston, a first fixed portion valve body-side end surface is formed in the first fixed portion on a side of the valve body, a second fixed portion piston-side end surface is formed in the second fixed portion on a side of the piston, a second fixed portion valve body-side end surface is formed in the second fixed portion on a side of the valve body, a second fixed portion inner peripheral surface is formed on an inner peripheral side of the second fixed portion, and a second fixed portion outer peripheral surface is formed on an outer peripheral side of the second fixed portion, and
the fixed portion is mounted on the flow path-side body by a diaphragm-holder, wherein
the flow path-side body includes a body-side first end surface which brings the first fixed portion valve body-side end surface and the second fixed portion valve body-side end surface into abutment against each other, and
a body-side ring-shaped projection forming a body-side projection inner peripheral surface against which the second fixed portion outer peripheral surface abuts,
the diaphragm-holder includes a diaphragm-holder inner peripheral side ring-shaped projection, and a diaphragm-holder outer peripheral side ring-shaped projection located on an outer periphery of the diaphragm-holder inner peripheral side ring-shaped projection,
a diaphragm-holder abutting surface is formed between the diaphragm-holder inner peripheral side ring-shaped projection and the diaphragm-holder outer peripheral side ring-shaped projection, the diaphragm-holder abutting surface being a single straight surface extending perpendicularly from the diaphragm-holder outer peripheral side inner peripheral surface to the diaphragm-holder inner peripheral side outer peripheral surface,
a diaphragm-holder inner peripheral side end surface of the diaphragm-holder inner peripheral side ring-shaped projection is abutted against the first fixed portion piston-side end surface,
a diaphragm-holder inner peripheral side outer peripheral surface of the diaphragm-holder inner peripheral side ring-shaped projection is abutted against the second fixed portion inner peripheral surface,
a diaphragm-holder outer peripheral side inner peripheral surface of the diaphragm-holder outer peripheral side ring-shaped projection is abutted against a body-side projection outer peripheral surface of the body-side ring-shaped projection, and the diaphragm-holder abutting surface, which is the single straight surface extending perpendicularly from the diaphragm-holder outer peripheral side inner peripheral surface to the diaphragm-holder inner peripheral side outer peripheral surface and is surrounded by the diaphragm-holder inner peripheral side ring-shaped projection and the diaphragm-holder outer peripheral side ring-shaped projection, is abutted against the second fixed portion piston-side end surface and a body-side projection end surface of the body-side ring-shaped projection.

2. The diaphragm valve according to claim 1, wherein the diaphragm-holder inner peripheral side ring-shaped projection and the diaphragm-holder outer peripheral side ring-shaped projection are press fitted into the body-side ring-shaped projection and the second fixed portion.

3. The diaphragm valve according to claim 2, wherein a second fixed portion chamfered portion is formed at a boundary between the second fixed portion inner peripheral surface and the second fixed portion piston-side end surface, and a diaphragm-holder inner peripheral side chamfered portion is formed at a boundary between the diaphragm-holder inner peripheral side outer peripheral surface and the diaphragm-holder inner peripheral side end surface.

4. The diaphragm valve according to claim 1, where the diaphragm-holder is made of material having higher mechanical strength than the diaphragm and the flow path-side body.

5. The diaphragm valve according to claim 1, where the diaphragm and the valve body are made of PTFE or PFA, and the diaphragm-holder is made of fluorocarbon resin selected from the group consisting of PVdF, thermoplastic resin, and composite material in which glass or carbon is mixed in thermoplastic resin, the thermoplastic resin being selected from the group consisting of PPS and PP.

6. The diaphragm valve according to claim 1, wherein the diaphragm-bolder is sandwiched between the flow path-side body and the driving-side body, and a sliding surface on which the piston slides is formed at a central portion of the diaphragm-holder.

* * * * *